Nov. 14, 1967   H. SCHMIDT   3,352,277
VISUAL INDICATOR
Filed Nov. 5, 1965
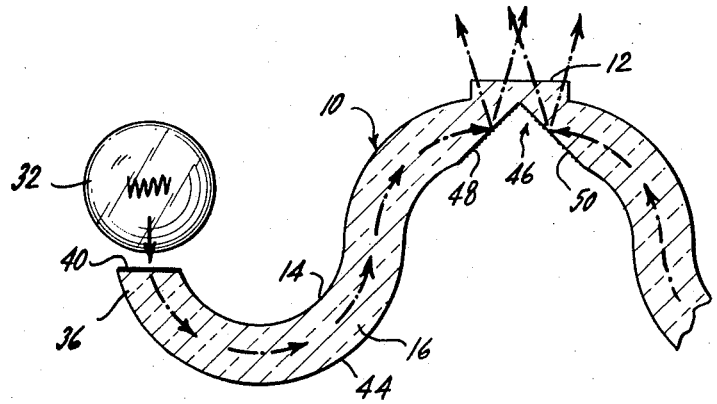
FIG. 4.
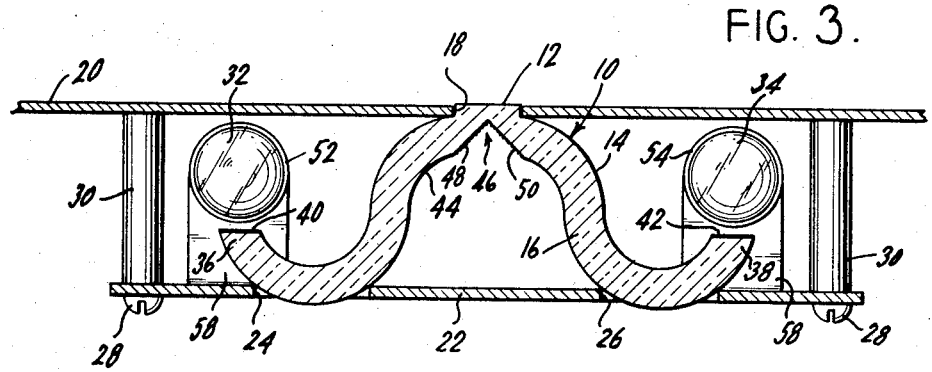
FIG. 3.
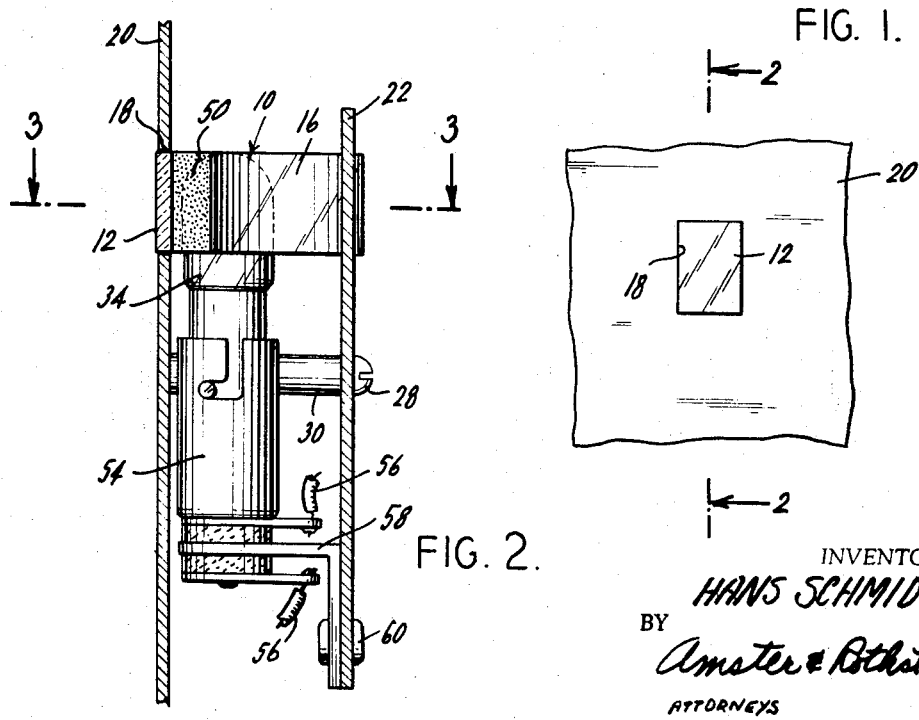
FIG. 1.
FIG. 2.
INVENTOR.
HANS SCHMIDT
BY Amster & Rothstein
ATTORNEYS

United States Patent Office 3,352,277
Patented Nov. 14, 1967

3,352,277
VISUAL INDICATOR
Hans Schmidt, Westhill, Ontario, Canada, assignor to Clavitone Sound Corporation Limited, Rexdale, Ontario, Canada
Filed Nov. 5, 1965, Ser. No. 506,494
2 Claims. (Cl. 116—114)

The present invention relates generally to a visual signal indicator, and more particularly to an improved indicator which can effectively be employed to display one or more light signals.

While not strictly limited to use in a stereophonic sound system, the visual indicator of the present invention is particularly useful in this environment because of its capability of displaying more than one visual signal. It is a relatively simple matter to make an appropriate operative connection for the visual indicator such that a separate light signal is presented by the device which is indicative of the operating condition of each of the speakers of the system. Although a variety of embodiments of visual signal indicators can be and are used for the foregoing purpose in a stereophonic sound system and like environments, these prior art indicators tend to be complicated in construction and operation.

Broadly, it is an object of the present invention to overcome the foregoing and other shortcomings of the prior art. Specifically, it is an object to provide an indicator, constructed in a simple manner of an appropriate light-transmitting plastic, and effective to display one and at least two light signals indicative of the operating conditions of the environment apparatus with which it is associated.

A visual signal indicator demonstrating features of the present invention comprises a plastic article of manufacture, preferably of light-transmitting acrylic plastic. Any appropriate shape may be provided the article consistent with the intended use of the indicator and the manner in which it is mounted in supporting structure. For example, an embodiment for displaying two light signals has an appropriately shaped body wherein opposite ends thereon are each located adjacent to a separate light source which, when energized or not, is indicative of one or the other of two possible operating conditions of the equipment. In a stereophonic sound system, for example, when each light is on it indicates that the speaker is working, and vice versa. The light enters into the body of the indicator at each end adjacent to the light source and is transmitted to an area in the medial portion of the indicator convenient for viewing. In this medial area, the indicator has improved structural features for presenting transmitted light as a signal, the two transmissions of light being more particularly displayed side-by-side in a comparatively small viewing area and in different colors so as to be readily distinguishable from each other.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a partial front elevational view of a visual signal indicator demonstrating features of the present invention;

FIG. 2 is a side elevational view, in section taken on line 2—2 of FIG. 1, illustrating further details of construction of the visual signal indicator;

FIG. 3 is a plan view, in section taken on line 3—3 of FIG. 2, illustrating a typical operative position for the visual signal indicator; and FIG. 4 is a partial plan view, on an enlarged scale, of the visual signal indicator and an associated light source.

Reference is made to the drawings wherein there is shown a visual signal indicator 10 demonstrating features of the present invention. Generally, the indicator 10 is of the well known type commonly used to present a visual signal determinative of an operating condition of a functional part of the equipment employing the visual signal indicator. For example, the indicator 10 may be employed in a stereophonic sound system for the purpose of visually indicating the operating condition of one or both the speakers of the system. As such, the indicator 10 is embodied in an appropriate manner in one of the units of the system, such as is illustrated in FIG. 3. In a preferred form of the indicator 10, a centrally located rectangular surface 12 on the front wall 14 of the body 16 of the indicator is accommodated in a rectangular aperture 18 of a front wall 20 of a chassis housing the indicator 10. The indicator 10 is held by a plate 22 having apertures 24, 26 receiving curved portions of the indicator body 16 and mounted in a spaced position from the front wall 20 by bolts 28 disposed through spacing cylinders 30 and threadably engaged with the front wall 20.

The indicator body 16 is fabricated of a light-transmitting plastic such as clear acrylic and in practice is adapted to transmit light from one or both of the light sources 32, 34 which are respectively located adjacent each of the opposite ends 36, 38 of the plastic body 16. As is generally understood, the energizing of the lights 32, 34 signify the operating condition of the stereophonic speakers and thus the light from the sources 32, 34 would serve as a visual indication of whether these speakers are functioning or not. This would be determined by simply viewing the surface 12 of the indicator 10 and noting whether a signal in the form of transmitted light is visable on the indicator 10.

Having reference now to FIG. 4 in conjunction with FIG. 3, the body ends 36, 38 are each provided with a surface coating 40, 42, respectively, of a dye or other coloring medium which is effective in a well-known manner of serving as a light filter for the rays of light emitted from each of the light sources 32, 34. As a result, the light which is actually transmitted through the two sections of the plastic body 16 is of different colors as viewed through the rectangular surface 12. In other words, the surface coating 40 may be such as to provide a red visual signal at the rectangular surface 12, whereas the surface coating 42 on the opposite body end 38 may be such as to provide a blue signal at the rectangular surface 12.

In accordance with the present invention, the light rays which are transmitted into the indicator 10 through the opposite ends 36, 38 thereon is effectively presented as a visual signal by virtue of the construction of the rear wall 44 of the plastic body 16 at a location immediately rearwardly of the rectangular surface 12. At this location, the body 16 is provided with a V-shaped notch or recess 46 which, in an obvious manner, provides two light-absorbing surfaces 48 and 50, each oriented at an angle across the path of transmission of the light rays through each of the curved sections of the plastic body 16. The surfaces 48, 50 are appropriately etched or otherwise evenly roughened into matted surfaces so as to efficiently function to absorb the light rays which are transmitted through the plastic body 16 and impinge upon the surfaces 48, 50. In this manner, a colored light signal is efficiently presented for viewing through the clear plastic body 16 of the member 10 at the rectangular surface 12 of the indicator 10. Moreover, since the surfaces 48, 50 function by absorbing the light rays impinging upon it, it should be appreciated that these visual signals are effectively seen at any angle from a position forward of the rectangular surface 12, which is not the case with such surfaces in indicator devices which function by reflecting light rays out of a viewing surface or area.

The light sources 32, 34 consist of bulbs threadably engaged in sockets 52, 54 to complete an electrical connection to conductor 56 of an appropriate electrical energy source. As best shown in FIG. 2, each socket 52, 54 is connected at its base to a mounting bracket 58 connected by a rivet or other suitable fastening means 60 to the plate 22.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A visual signal indicator comprising a body fabricated of a light-transmitting plastic and formed with an appropriate shape respectively presenting a first body end and a second body end to a light source and having an intermediate body area in an advantageous position for viewing, said intermediate body area having two light-absorbing surfaces located thereon in the path of travel of the light transmitted through said body which are illuminated by the absorption of said transmitted light to present visible signals on said intermediate body area, and said first and second body ends having light-coloring means thereon for providing the light passing therethrough with distinctive colors.

2. A visual signal indicator as defined in claim 1 wherein said light-absorbing surfaces are formed by a V-shaped recess extending into the body and orienting each of said surfaces at an inclined angle relative to the front wall of said body, said inclined light-absorbing surfaces being viewed through the front wall of said body.

References Cited

UNITED STATES PATENTS

| | | | |
|---|---|---|---|
| 1,645,211 | 10/1927 | Zeal | 240—1 |
| 2,159,095 | 5/1939 | Mudon | 88—1 |
| 2,186,143 | 1/1940 | Neugass | 240—1 |
| 2,196,166 | 4/1940 | Bryce | 240—1 |
| 2,218,074 | 10/1940 | Smith | 88—1 |
| 2,247,258 | 6/1941 | Shepard | 240—1 |
| 2,316,589 | 4/1943 | Iwanowicz | 240—1 |
| 2,428,975 | 10/1947 | Lamb | 240—1 |
| 2,589,569 | 3/1952 | Peter et al. | 88—1 |
| 2,611,018 | 9/1952 | Thorp | 240—1 |
| 3,143,098 | 8/1964 | Blackwell | 116—129 |
| 3,188,478 | 6/1965 | Binks | 88—1 |
| 3,224,279 | 12/1965 | Galli et al. | 88—1 |
| 3,228,108 | 1/1966 | Chaperon | 88—1 |

FOREIGN PATENTS

| | | |
|---|---|---|
| 674,238 | 6/1952 | Great Britain. |
| 816,795 | 5/1937 | France. |
| 1,186,791 | 2/1965 | Germany. |

LOUIS J. CAPOZI, *Primary Examiner.*